Nov. 20, 1956  J. JESIONOWSKI  2,771,161
ANTI-SKID APPARATUS
Filed Dec. 13, 1954
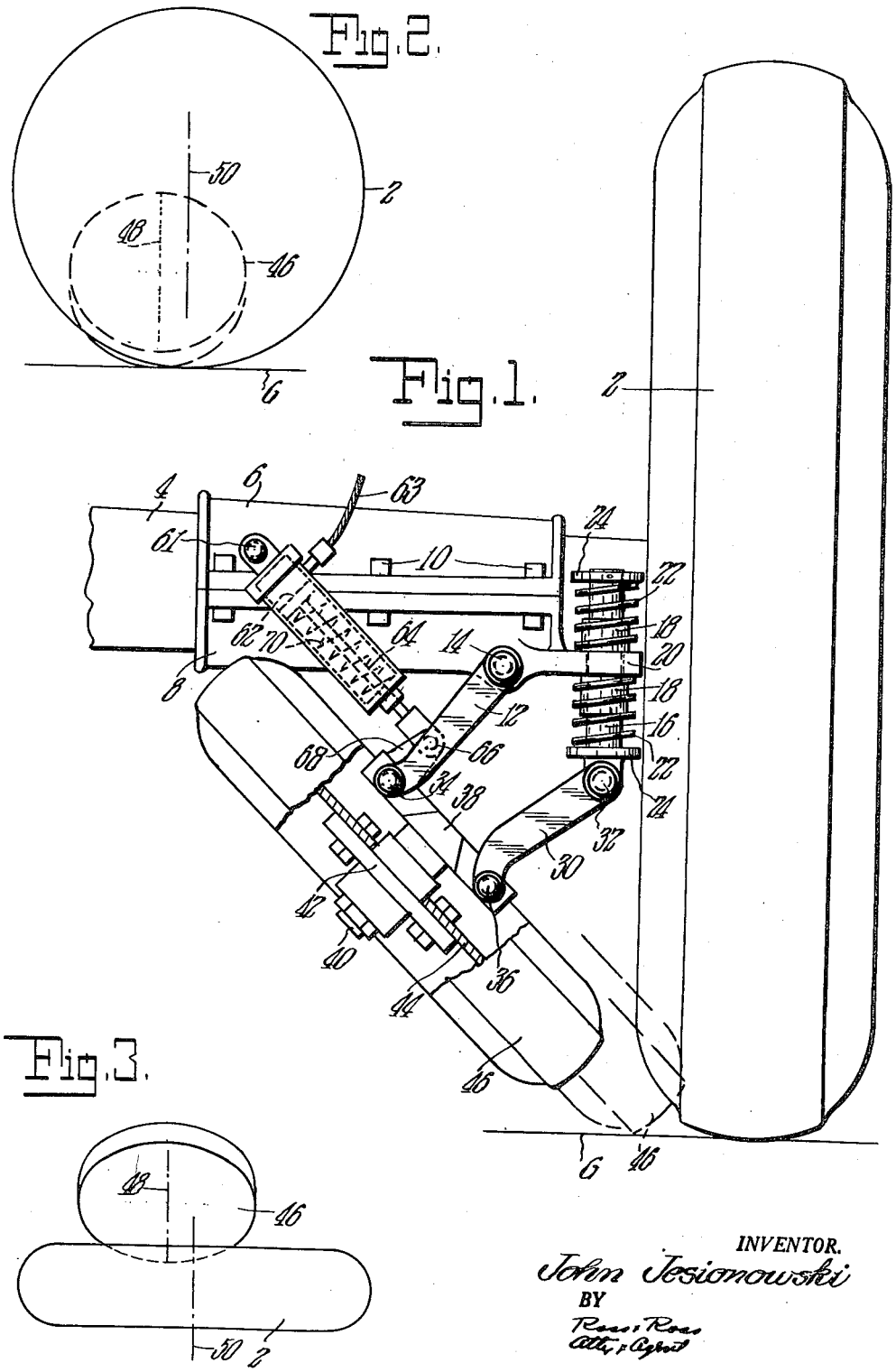
INVENTOR.
John Jesionowski
BY

United States Patent Office 2,771,161
Patented Nov. 20, 1956

2,771,161

ANTI-SKID APPARATUS

John Jesionowski, Schenectady, N. Y.

Application December 13, 1954, Serial No. 474,711

3 Claims. (Cl. 188—4)

This invention relates to improvements in anti-skid apparatus for vehicles.

The principal objects of the invention are directed to the provision of anti-skid device for the tire or tires of a vehicle wheel and may be used with any or all of the wheels of a vehicle.

According to novel features of the invention an anti-skid wheel is mounted on the vehicle structure inwardly of the vehicle wheel for movement outwardly towards said wheel for its anti-skid function.

The anti-skid wheel is so mounted that it moves outwardly for its anti-skid function in a vertcial plane disposed forwardly of a vertical plane extending through the axis of rotation of the vehicle wheel. At the same time the anti-skid wheel is rotatable on an axis disposed angularly relative to the horizontal axis of rotation of the vehicle wheel. The axis of rotation of the anti-skid wheel is disposed at an angle say of forty-five degrees relative to the horizontal axis of rotation of the vehicle wheel.

In the anti-skid operation of the apparatus the anti-skid wheel is moved outwardly towards the vehicle wheel in a manner to wedge between the ground and vehicle wheel forwardly of the contact of the vehicle wheel and the ground.

The anti-skid wheel will be provided with a resilient tire as are vehicle wheels and the said tires may be of the air inflated type or of the resilient solid type.

The anti-skid tire may be provided with anti-skid means such as buttons, cross chains or any suitable means adapted for anti-skid purposes.

As the anti-skid wheel is moved to operative anti-skid position so that it is in contact with the road way just forwardly of the vehicle wheel the wedging action is such as to prevent side ways skidding of the vehicle. The vehicle wheel tends to ride onto the tire of the anti-skid wheel, the tires being resilient and the anti-skid wheel being angular to the ground the anti-skid function is readily and quickly accomplished.

In practice there will be anti-skid wheels for the opposite wheels of a vehicle and preferably for the rear wheels of the vehicle so as to prevent sidewise skidding in opposite directions.

The arrangement of the apparatus is such thtat the anti-skid wheel may be moved quickly and positively into its anti-skid position and may be as quickly and positively withdrawn.

The operation of the anti-skid wheel may be accomplished by various means but in one way will be actuated by pressure means such as air pressure or hydraulic pressure supplied from a suitable source such as a pump, tank or the like associated with the vehicle.

An anti-skid wheel of the invention may be provided for opposite wheels of a vehicle or such wheels as may be desired and plural anti-skid wheels may be simultaneously operated.

The anti-skid apparatus of the invention may be associated and supported by various parts of a vehicle chassis but for purposes of disclosure only it is hereinafter shown and described in association with an axle.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a front elevational view of a rear tire of a vehicle resting on the ground and having the novel features of the invention associated therewith;

Fig. 2 is a diagrammatic side elevational view of the vehicle tire having the anti-skid tire of the device of the invention associated therewith; and Fig. 3 is a diagrammatic top plan view of the vehicle and anti-skid tire shown in Fig. 2.

Referring now to the drawings more in detail the invention will be full described.

A vehicle tire of a rear wheel of a vehicle is represented by 2 which is rotatable relative to a rear axle 4 of a vehicle chassis for rolling along the ground G.

It will be understood that the apparatus of the invention may be supported by any desired portion of a vehicle chassis. For illustrative purposes the apparatus is supported by a bracket consisting of upper and lower half-parts 6 and 8 secured together aroung the axle by bolts 10.

An inner lever or link 12 is pivoted at 14 to bracket part 8. A rod 16 is slidable up and down in guides 18 of bracket part 20 and springs 22 are disposed between collars 24 fixed to the rod 16 and the bracket part 20. An outer lever or link 30 is pivoted at 32 to the lower end of the rod 16.

Outer ends of the levers 12 and 30 are pivotally connected at 34 and 36 to a carrier 38 for swinging of said carrier between the inner inoperative and outer anti-skid positions of the anti-skid wheel.

An axle 40 is fixed to the carrier 38 and a hub 42 is journalled thereon preferably by anti-friction bearing means for free rotation of the said hub. The hub 42 is suitably secured to the web 44 of an anti-skid wheel on which a tire 46 is mounted.

The arrangement of the links 12 and 30 and the pivotal connections are such that the carrier is swingable between the inner inoperative position of the anti-skid tire 46 shown and an outer anti-skid position thereof indicated by dash lines, in Fig. 1.

A vertical plane extending through the axis of rotation of the anti-skid wheel, indicated by 48, is forwardly of a parallel plane extending through the axis of rotation of the wheel 2 as indicated by 50, see Fig. 2.

In the anti-skid position of the tire 46 its outer periphery is wedged between the tire 2 at its forward lower portion and the ground thereby to act as a wedge and prevent skidding sideways of the vehicle wheel.

With opposite wheels of a vehicle provided with anti-skid wheels skidding in opposite directions is prevented with the anti-skid wheels in operative position.

The rod 16 being slidable in the guideway allows up and down movements of the link 30 and the springs 22 cushion such movements as may be caused by the roughness of the roadway.

The carrier may be swung on its link connections by various means as may be desired. Where opposite wheels of a vehicle are equipped with anti-skid devices the operating means will be arranged to actuate both devices simultaneously.

One form of operating mechanism will include a cylinder 60 having a piston 62 reciprocable therein. A rod 64 of said piston is pivotally connected at 66 to a lug 68 of the carrier and said cylinder will preferably be pivotally connected at 61 to bracket part 6.

The cylinder 60 will be connected by conduit 63 to a source of air or hydraulic pressure such as a pump, tank or the like and will be controlled by suitable means.

As pressure is admitted to the cylinder 60 the piston 62 and rod 64 act on the link suspended carrier to swing it to anti-skid position of the tire 46. The arrangement of the operating mechanism is such that in operation thereof forces are applied in the direction of movement of the carrier. This insures positive and quick action without binding of the parts.

The anti-skid apparatus is quickly returned to inoperative position by a spring 70 acting on piston 62 as pressure to the cylinder is released.

The tire 46 may be of the inflated type or the more solid resilent type and in any case will have the cross sectional shape as will best adapt it for its wedging anti-skid function.

It will be observed that the apparatus is so constructed and arranged that the anti-skid tire is moved to anti-skid position wherein the outer portion of its periphery is disposed at the inner side of the vehicle tire and forwardly of the lower forward portion of the vehicle tire so as to wedge between the vehicle tire and ground.

The tire 46 may of course be provided with an anti-skid tread or be equipped with anti-skid chain means or the like as may be desired to enhance the anti-skid action.

In addition to the non-skid function of the anti-skid tire it is adapted when in an anti-skid position to provide additional traction for the vehicle wheel. That is the anti-skid tire being wedged as it is between the vehicle wheel and ground it cooperates for added traction which is desirable on slippery roadways or in mud or snow.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the claims below.

What it is desired to claim and secure by Letters Patent of the United States is:

1. The combination with a vehicle chassis having a pneumatic tired road wheel of anti-skid apparatus for said tire comprising, a carrier having an anti-skid wheel rotatable thereon provided with a pneumatic anti-skid tire, pivotal connections and other pivotal and yieldable connections between said carrier and chassis swingably mounting said carrier on said chassis for movements of the carrier between inner inoperative and outer operative anti-skid position, said connections constructed and arranged to position the axis of the anti-skid wheel in a vertical plane parallel to and forwardly of a vertical plane extending through the axis of the road wheel and position the inner periphery of the anti-skid tire in a plane above that of the outer periphery thereof in all positions of the carrier and adapted to position said outer periphery of said anti-skid tire in wedging anti-skid relation with the lower forward portion of the tire of the road wheel and roadway thereunder in operative position of the carrier.

2. Anti-skid apparatus set forth in claim 1 wherein said connections includes spaced inner and outer links each pivotally connected at one end to said carrier with an opposite end of the inner link pivotally connected to a member secured to said chassis and an opposite end of the outer link pivotally connected to a member yielding slidable in said member.

3. Anti-skid apparatus set forth in claim 1 wherein said connections includes spaced inner and outer links each pivotally connected at one end to said carrier with an opposite end of the inner link pivoted to a supporting member provided in fixed relation on said chassis and an opposite end of outer link pivotally connected to a rod member slidably provided in said supporting member and means resisting sliding of said rod member in opposite directions.

References Cited in the file of this patent

UNITED STATES PATENTS

| | | |
|---|---|---|
| 1,150,148 | Putnam | Aug. 17, 1915 |
| 1,330,110 | Daniels | Feb. 10, 1920 |
| 1,374,252 | Thorne et al. | Apr. 12, 1921 |
| 2,140,606 | Stickles | Dec. 20, 1938 |
| 2,264,466 | Weisel | Dec. 2, 1941 |
| 2,277,036 | Chaussee | Mar. 24, 1942 |
| 2,295,837 | Gerth | Sept. 15, 1942 |